United States Patent [19]

Seabase

[11] 4,305,623
[45] Dec. 15, 1981

[54] HYDRAULIC BRAKE CONTROLLER

[75] Inventor: Peter P. Seabase, Cuyahoga Falls, Ohio

[73] Assignee: National Machine Company, Stow, Ohio

[21] Appl. No.: 80,586

[22] Filed: Oct. 1, 1979

[51] Int. Cl.³ ............................................. B60T 15/06
[52] U.S. Cl. .................................................... 303/54
[58] Field of Search ...................... 303/50, 51, 52, 53, 303/54, 55, 56, 10; 137/627.5, 102; 200/82 C, 82 D

[56] References Cited

U.S. PATENT DOCUMENTS 3,684,330  8/1972  Kito ........................................ 303/54
4,172,619 10/1979  Anderson et al. ..................... 303/54

Primary Examiner—Douglas C. Butler
Attorney, Agent, or Firm—Hamilton, Renner & Kenner

[57] ABSTRACT

A hydraulic controller for providing regulated transfer of pressurized fluid between a tank (T), an accumulator (A) serviced by a source of pressurized fluid (PS), and the brakes (B) of a vehicle including a housing (36,37; 236,237), an actuator plunger (45; 245) extending into the housing, a regulator spring (57; 257) operatively connected to the actuator plunger, and actuator (11; 247) for selectively moving the actuator plunger to controllably compress the regulator spring, and a regulating spool (65; 265) variably positioned by the regulator spring and the pressurized fluid to relieve pressurized fluid in the brakes to the tank and to provide pressurized fluid from the accumulator to the brakes at a pressure proportional to the compression of the regulator spring. The regulator spring may be a plurality of staged springs (161,165) to provide different spring rates and an override (330) may be provided on the actuator plunger for selectively compressing the regulator spring in response to a pressurized fluid input.

36 Claims, 4 Drawing Figures

HYDRAULIC BRAKE CONTROLLER

TECHNICAL FIELD

The present invention relates generally to brake systems for heavy vehicles. More particularly, the present invention relates to a hydraulic brake controller which is particularly adapted for use with heavy, e.g., off-the-road, vehicles. More specifically, the invention relates to an integrated hydraulic brake controller which may be employed with heavy vehicles and provides the operational and back up characteristics heretofore associated with systems employed in smaller vehicles.

BACKGROUND ART

The evolution of brake systems for heavy duty applications, such as off-the-road vehicles, has largely seen the piecemeal assemblage of oversized components from systems designed for smaller vehicles. Attempts have been made to employ air, hydraulic or combined systems in such a fashion as to provide braking characteristics required for a specific vehicle with auxiliary and back up elements as required for a particular application. None of these systems employed to data have achieved broad commercial acceptance in regard to a variety of types of off-the-road vehicles.

Perhaps the most common type of such braking systems is essentially an oversized conventional air brake system provided with multiple control valves and multiple reservoirs to produce suitable braking capacity for the vehicle involved. These oversized air systems have the disadvantages of requiring large volumes of low pressure air, providing reaction time delays, and incorporating numerous relay valves and auxiliary tanks. Such air brake systems present substantial compressor requirements with attendant disadvantages such as cold weather problems in the nature of moisture freezing in the air lines. Auxiliary dryers and filters for reducing moisture and eliminating contamination are necessary, together with regular maintenance to prevent air system degradation or failure. In addition, air systems inherently provide nonlinear braking response and do not in the absence of uncommon sophistication provide pedal "feel."

In the case of combined air and hydraulic systems such as air hydraulic intensifier systems all of the normal air circuitry is required as well as a variety of hydraulic components. Thus, dual maintenance capabilities with respect to both air and hydraulic systems are required to maintain these systems. In addition, if master cylinders are used in such systems low fluid or brake misadjustment can result in insufficient fluid displacement and loss of braking capability even though the air control circuitry may be functioning satisfactorily. To provide a complete warning capability in these systems requires duplication of sensors in the hydraulic circuit to signal system degradation or failure.

Existing hydraulic systems for these applications have generally followed the approach of oversizing systems designed for smaller, lower load applications. In this respect, oversizing can result in extremely high brake pedal pressures, oversized system components and lack of system flexibility in handling secondary warning and back up features. In addition, poppet valves and other element arrangements which may be satisfactory for small, relatively low pressure systems may in some instances be ultra sensitive or lacking in flexibility in their adaptation to large system requirements.

DISCLOSURE OF THE INVENTION

Therefore, an object of the present invention is to provide an integrated hydraulic brake controller particularly for heavy vehicles which effects power hydraulic control of multiple brake circuits by direct actuation together with suitable back up and auxiliary control elements. Another object of the present invention is to provide a hydraulic brake controller with a valve module having a differential area regulating spool which operates in such a fashion that balancing fluid pressures, which may be on the order of 3,000 psi, operate on only a portion of the spool, such that a relatively small regulator spring may be employed which is capable of being operatively compressed by a standard vehicle pedal assembly without power assistance. A further object of the invention is to provide a hydraulic brake controller valve module wherein the regulating spool thereof is of sufficiently large size to make fluid flow channels and orifices thereof of adequate size to permit sufficiently high fluid flow rates for fast brake response.

Yet another object of the invention is to provide a hydraulic brake controller which may have a plurality of valve modules capable of simultaneously supplying different brake elements from a single accumulator pressure at anywhere from 500 to 3,000 psi. A still further object of the invention is to provide a valve module having a staged regulator spring assembly to provide two different linearly responsive pressure control outputs for preselected variation in brake capacity over the operating range of a valve module. Another object of the invention is to provide a hydraulic brake controller having a pressure switch associated with the power source input to the accumulator for providing a warning signal or instituting corrective action in the event of pressure fluctuations sufficient to adversely affect brake system operation.

Still another object of the invention is to provide a hydraulic brake controller having an auxiliary pilot regulator and automatic application module capable of providing proportional fluid control to the brakes in addition to foot control for the application of a hand brake or other independent signal and to supply braking in the event of accumulator pressure failure or other system defect. A further object of the invention is to provide such a pilot regulator and automatic application module which may be maintained in a maximum braking application position until positive control is effected to produce a reduced or discontinuance of braking output. It is another object of the invention to provide a hydraulic override for use in conjunction with a brake controller valve module which operates in conjunction with normal manual operation to provide proportional braking to a brake circuit upon receipt of a signal as from a pilot regulator or automatic application module.

Yet a further object of the invention is to provide a hydraulic brake controller with sufficient design flexibility to provide a high degree of response and safety while retaining a relatively simple compact design for ease of installation and servicing. A still further object of the invention is to provide a relatively high pressure hydraulic brake controller which requires relatively low volume, small brake lines and which eliminates the delays associated with air or air/hydraulic systems. Yet another object is to provide a hydraulic brake controller which provides both accurate pressure control and reflective pedal feel or feedback in all operational modes.

In general, a hydraulic controller for providing regulated transfer of pressurized fluid between a tank, an accumulator serviced by a source of pressurized fluid, and the brakes of a vehicle according to the concepts of the present invention includes a housing, an actuator plunger extending into the housing, one or more regulator springs operatively connected to the actuator plunger, a brake pedal or other actuator for selectively moving the actuator plunger to controllably compress the regulator spring, and a regulating spool variably positioned by the regulator spring and the pressurized fluid to relieve pressurized fluid in the brakes to the tank and to provide pressurized fluid from the accumulator to the brakes at a pressure proportional to the compression of the regulator spring.

PREFERRED EMBODIMENT FOR CARRYING OUT THE INVENTION

Figure 1:
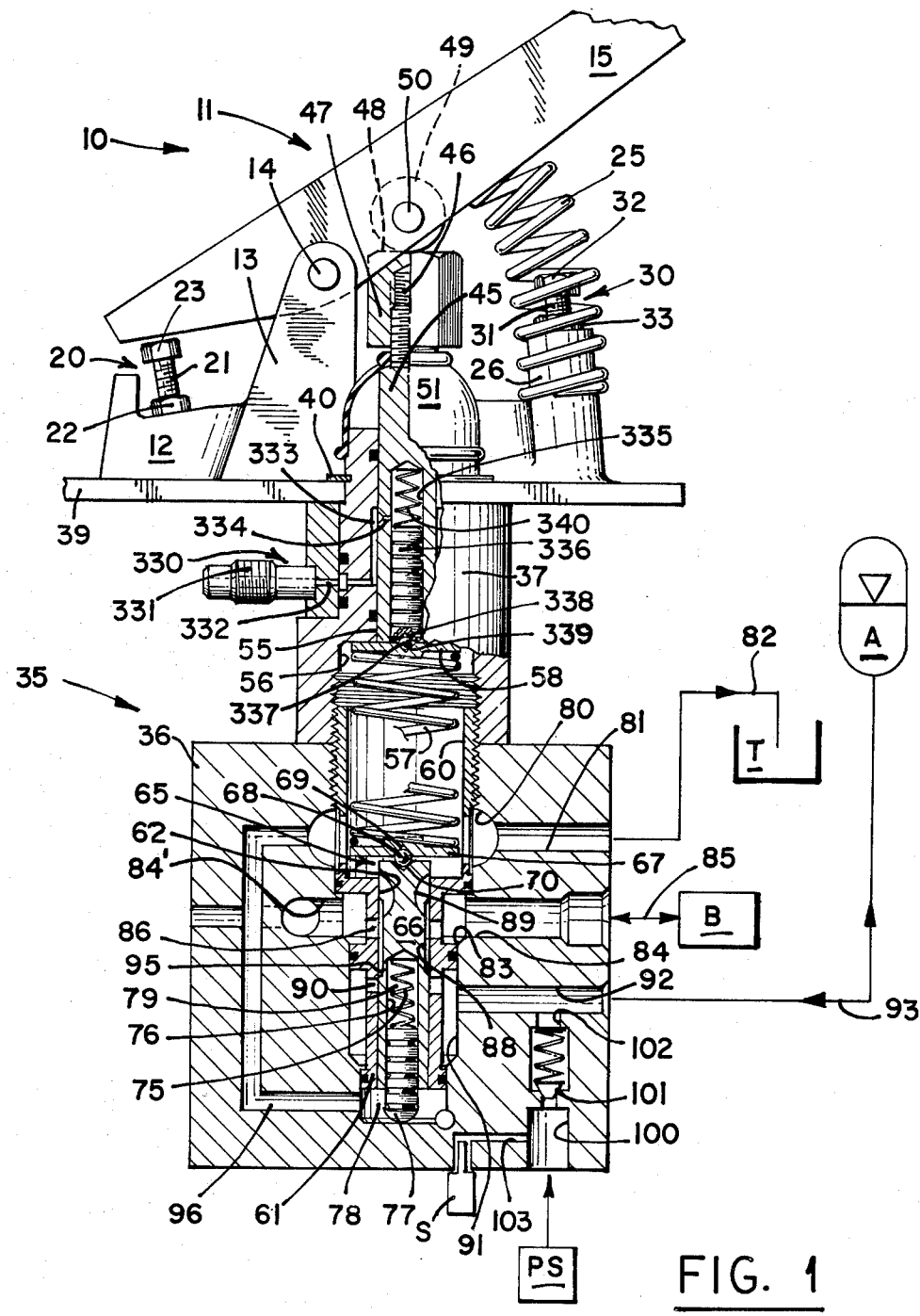
FIG. 1 is a sectional view of the valve module portion of a hydraulic brake controller according to the present invention with an interconnected brake pedal assembly shown in elevation and hydraulic interconnections with a tank, accumulator, brakes and power source being shown schematically.

A hydraulic brake controller according to the concepts of the present invention is generally indicated by the numeral 10 in FIG. 1. As shown for exemplary purposes, the controller 10 may include or be connected to an actuator in the form of a brake pedal assembly, generally indicated by the numeral 11. The brake pedal assembly 11 may be positioned in a vehicle on the floor or firewall F on which a mounting bracket 12 is seated. The mounting bracket 12 may have an upwardly projecting arm 13 which carries a pivot pin 14 on which a conventional brake pedal 15 is pivotally mounted. The mounting bracket 12 has an adjustable pedal return stop, generally indicated by the numeral 20, mounted to one side of the pivot pin 14 for engagement by the portion of the brake pedal 15 which accommodates an operator's heel. The pedal return stop 20 may take the form of a cap screw 21 which may be threaded into the bracket 12. A nut 22 may be threaded onto the cap screw 21 to lock cap screw 21 with any desired length extending out of bracket 12 to control the extent of pivotal travel of brake pedal 15 counterclockwise as viewed in FIG. 1 before stopping engagement with the head 23 of cap screw 21.

Brake pedal 15 is biased counterclockwise about pivot pin 14 as viewed in FIG. 1 into engagement with cap screw 21 when not being actuated by an operator's foot as by a pedal return spring 25. As shown, the pedal return spring 25 may be a conventional coil spring engaging the underside of brake pedal 15 to the other side of pivot pin 14 from the portion engaging cap screw 21 and mounted about a cylindrical extension 26 of the bracket 12. The return spring 25 provides sufficient counterclockwise biasing of brake pedal 15 to bias it into engagement with the pedal return stop 20 in the absence of foot pressure or other forces thereto.

An adjustable maximum brake pressure stop, generally indicated by the numeral 30, may be mounted in conjunction with the return spring 25 or separately. As shown, the maximum brake pressure stop 30 is mounted to extend from the cylindrical extension 26 of the bracket 12 such as to limit the clockwise pivotal travel of the brake pedal 15 about pivot pin 14. As shown, a cap screw 31 is threaded into the cylindrical extension 26 in a position such that the head 32 may engage the underside of brake pedal 15. A nut 33 threaded on the shank of cap screw 31 permits adjustable axial positioning of the extension of cap screw 31 from the cylindrical extension 26 in a manner comparable to adjustable pedal return stop 20.

The brake pedal assembly 11 is operatively interrelated to a valve module, generally indicated by the numeral 35, of the brake controller 10. As shown, the valve module 35 has a valve housing 36 and an actuator housing 37. The actuator housing 37 extends through an aperture in a vehicle floor or firewall and is operatively positioned relative to brake pedal assembly 11. As shown, the pedal assembly 11 may have a flange 39 engaging the upperside of the floor or firewall. A snap ring 40 restrains housing 37 to pedal assembly 11. The actuator housing 37 partially encases a mechanical actuator plunger 45 which extends outwardly of the housing 37. The extremity of mechanical actuator plunger 45 may have threads 46 to receive a matingly threaded adjusting lug 47. The adjusting lug 47 has an engaging surface 48 which contacts a roller 49 which is freely rotatably journaled on a pin 50 mounted on the brake pedal 15. The pin 50 carrying roller 49 may be mounted between the pedal return stop 20 and the maximum brake pressure stop 30 and preferably proximate to the pivot pin 14 for brake pedal 15. Thus, clockwise movement of the brake pedal 15 from the position depicted in FIG. 1 causes the roller 49 to move the lug 47 and the attached mechanical actuator plunger 45. Adjustment of the lug 47 axially along the threads 46 of mechanical actuator plunger 45 permits a lead or lag adjustment in the actuation of mechanical actuator plunger 45 relative to the movement of brake pedal 15. A bell-shaped boot 51 of an elastomeric material may interconnect actuator housing 37 and mechanical actuator plunger 45 in a conventional manner to maintain a dirtfree seal during movement of actuator plunger 45.

The mechanical actuator plunger 45 extends through a bore 55 in actuator housing 37 and terminates proximate an enlarged bore 56 which houses a regulator spring 57. The mechanical actuator plunger 45 is connected for displacement of regulator spring 57 in bore 56 by a spring seat 58 which is attached to one extremity of regulator spring 57 and which abuts the axial extremity of the mechanical actuator plunger 45.

The regulator spring 57 also extends into a bore 60 in valve housing 36 cooperatively formed as an extension of bore 56 of actuator housing 37. The valve housing 36 in addition to bore 60 is internally machined to receive an elongate sleeve 61 which has a central through bore 62 to receive a differential area regulating spool, generally indicated by the numeral 65. As shown, the regulating spool 65 has an elongate body 66 of substantial axial extent positioned such that an extent of regulating spool 65 extends into enlarged bore 60 of valve housing 36. The axial extremity of spool 65 extending into bore 60 of valve housing 36 interengages the regulating spring 57. This interengagement is effected by a spring seat 67 which may be similar to the spring seat 58 and seats the opposite end of regulator spring 57. A ball 68 positioned in conical seats 69 and 70 in the spring seat 67 and the axial extremity of spool 65, respectively, provides interconnection between regulator spring 57 and spool 65 for the transmittal of force axially of spool 65, irrespective of minor directional fluctuations in the application of force by regulator spring 57 to spool 65.

The aforementioned extension of spool 65 into the bore 60 of valve housing 36 is effected by a spool return spring 75 which biases the spool 65 into engagement with regulator spring 57 via ball 68 and spring seat 67. The return spring 75 is positioned in a bore 76 in spool 65 which also houses a reaction piston 77 which engages the end of return spring 75 opposite the spool 65. The end of reaction piston 77 opposite the return spring 75 is maintained in engagement with a portion of valve housing 36 in a reservoir 78 formed below and axially beyond the elongate sleeve 61. Thus, a reaction pressure chamber 79 is formed in spool 65 in the portion of bore 76 above reaction piston 77 where the return spring 75 is housed.

With the spool 65 extended into bore 60 in the non-actuated position of the brake pedal 15 depicted in FIG. 1, the schematically depicted brakes B have no pressure as the fluid is relieved through the valve module 35 as hereinafter described to the schematically depicted tank T. As seen in FIG. 1, fluid return to the tank T is effected by a channel 80 in the periphery of bore 60 which is connected by a duct 81 extending through valve housing 36 and connected to conventional conduit 82 which communicates with the tank or reservoir T. The brakes B interrelate to the spool 65 by virtue of a channel 83 positioned radially outwardly of the elongate sleeve 61. The channel 83 connects with a duct 84 which extends through valve housing 36 and is attached to standard conduit or lines 85 connected to one or more standard brake assemblies B. The brake channel 83 communicates via a brake port 86 located in the sleeve 61 which extends entirely through the cylindrical wall of the sleeve.

The spool 65 is provided with an axial pressure transfer cavity 88 which in the position of FIG. 1 is in coincidence with the brake port 86 and remains in communication therewith during the entire operational travel of the spool 65. The pressure transfer cavity 88 terminates upwardly in a relief passage 89 in spool 65 which may be of generally semicircular cross-sectional configuration. The upper axial extremity of the relief passage 89 extends beyond the axial upper exterior of sleeve 61 in the position of spool 65 depicted in FIG. 1 such that pressure within the brakes B is continually relieved from the brake port 86 through th pressure transfer cavity 88 into the relief passage 89 into the bore 60 which communicates through the tank channel 80, duct 81 and conduit 82 to the tank T. In such position a condition of no brake line pressure is maintained at all times.

Upon depression of the brake pedal 15 producing clockwise rotation thereof the actuator plunger 45 moves to controllably compress the regulator spring 57 to thus advance the spool 65 downwardly as viewed in FIG. 1. As the spool is initially incrementally displaced, the relief passage 89 moves into the sleeve 61 such that the passage 89 no longer communicates with the bore 60 and ultimately the tank T. Thus, the brakes B are no longer in fluid flow communication with the tank T such that the institution of brake line pressure for actuating the brakes B thereafter potentially exists. After the initial incremental movement of the spool 65 further downward movement in response to movement of actuator plunger 45 as a result of depression of brake pedal 15 moves the pressure transfer cavity 88 of spool 65 into communication with accumulator port 90 which extends through the sleeve 61. The accumulator port 90 connects with an accumulator channel 91 positioned outwardly of sleeve 61 within the valve housing 36. The accumulator channel 91 in turn connects with an accumulator duct 92 extending through the valve housing 36 to which is attached a conventional accumulator conduit 93 which terminates in a standard accumulator A depicted schematically in FIG. 1. The pressurized fluid in accumulator A is thus permitted to flow via the pressure transfer cavity 88 into the brakes B. The pressure in the pressure transfer cavity 88 is also transferred via an orifice 95 extending from the pressure transfer cavity 88 to the reaction pressure chamber 79 to assert an equivalent pressure on the surface area of the spool 65 within the bore 76. The size of orifices 95 is also significant to provide rapid damping of oscillatory tendencies of the spool 65 due to dynamic forces which may be applied to the unit and any spring vibration which could be instituted in the regulator spring 57 or spool return spring 75.

The pressurized fluid from the accumulator A flows to the brakes B until such time as the pressure internally of the spool 65 in reaction pressure chamber 79 is equal to the pressure created by regulator spring 57 by virtue of the positioning of the actuator plunger 45. When the pressure is so equalized the spool 65 has moved upwardly a sufficient distance to move the pressure transfer cavity 88 out of communicating alignment with the accumulator port 90 thus stabilizing the system at then existent pressure in the brakes B.

It is to be noted that the differential area regulating spool 65 is so configured that the pressure in reaction pressure chamber 79 effectively operates on only a portion of the total radial dimension of the spool body 66, namely, to the extent of the diameter of the bore 76, the reaction piston 77 precluding the escape of fluid downwardly within the spool 65 into the reservoir 78. Any fluid which may escape between reaction piston 77 and spool 65 into the reservoir 78 is drained via a duct 96 to the tank channel 80 which remains constantly relieved to the reservoir or tank T. The operation of the braking pressure from the accumulator A on only a portion of the radial extent of the spool 66 permits selection of a relatively small regulator spring 57 as compared with what would otherwise be necessitated to effect balancing with respect to braking pressures which may be on the order of 3,000 psi. While regulator spring 57 may be retained within reasonable size limitations, it is also significant that the spool which has a reduced pressure reaction surface may be of sufficiently large size to make pressure transfer cavity 88 and other fluid flow channels and orifices of sufficiently large cross-sectional area such as to permit sufficiently high fluid flow rates to provide fast brake response.

It is to be appreciated that from the aforedescribed brake position, the further actuation of brake pedal 15 in a clockwise rotation would provide additional compression of regulator spring 57 in such a manner as to displace the spool 65, permit the introduction to brakes B of pressurized fluid from the accumulator A, and thereafter reach a position of pressure balance of the spool 65 at a proportionally higher pressure, the pressure control being linearly responsive to the displacement of the actuator plunger 45 during increasing or decreasing pressure operation. It will also be appreciated that the flow rate is a function of the rate at which the spool 65 is shifted in response to compression of regulator spring 57 by movement of actuator plunger 45 effected by brake pedal 15. Thus gradual application of the brakes by slow movement of the pedal 15 allows slow pressure and flow control whereas fast application provides rapid high pressure flow control and regulation.

In instances of very fast actuation of the plunger 45, as may be experienced in a panic stop, the flow of pressurized fluid from the accumulator A to the brakes B may exceed that required to achieve pressure balance of the spool 65 such that the spool 65 may be displaced slightly upwardly as viewed in FIG. 1. Such upward displacement of spool 65 results in pressure being relieved from the brakes B by the flow of fluid via the pressure transfer cavity 88 to the relief passage 89 which communicates through tank channel 80 with the reservoir or tank T. With any extra pressure thus relieved the spool 65 then assumes a balanced position in cooperation with the regulator spring 57 as controlled by the position of actuator plunger 45.

On release of the brake pedal 15 permitting it to return to the position of FIG. 1, by operation of the pedal return spring 25 until contacting the pedal return stop 20, the spool 65 is immediately shifted to the position depicted in FIG. 1 such that flow is terminated from the accumulator A to the brakes B and the brakes are quickly relieved to tank via the pressure transfer cavity 88, the pressure relief passage 89 to bore 60 and to tank T through the tank channel 80. Since the spool 65 is substantially continually balanced the reaction pressure on the spool 65 existing in the reaction pressure chamber 79 acts against the regulator spring 57 and is transferred through the spring via the actuator plunger 45 to the pedal 15 to provide a pressure feedback which gives the pedal "feel" desirable in any type of brake system.

It is to be appreciated that valve module 35 may service a plurality of brakes B. In this respect the channel 83 may be provided with additional ducts besides the duct 84 as, for example, the duct 84' which may lead to another brake or another set or sets of brakes as may be necessary in regard to a particular installation. It will also be apparent to persons skilled in the art that a single brake pedal assembly 11 may be configured in such a fashion as to operate two or more valve modules 35, again dependent upon the nature of the brake system to be controlled.

In similar fashion two or more accumulators may service the accumulator channel 91 by connection to the channel or, for example, by interconnection to the accumulator duct 92 which communicates with the channel 91. The accumulator A is maintained at a predetermined pressure by virtue of its interconnection with a power source PS which may take the form of a pressure compensated piston pump or other such charging device as will be apparent to persons skilled in the art. The power source PS may communicate with the accumulator A by an inlet duct 100 which is connected to a check valve schematically depicted at 101 having an output duct 102 which connects with accumulator A via its termination in accumulator duct 92. The check valve 101 permits flow of pressurized fluid from the power source PS to the accumulator A but prevents return flow from the accumulators to the power source PS. In this manner one or more accumulator and regulator sections can be supplied independently from one pressure source. A pressure switch S hereinafter detailed may be inserted in the valve housing 36 proximate to the inlet duct 100 and communicate therewith via a duct 103 to sense the supply of fluid from the power source PS to the accumulator A, or a plurality thereof.

In brake configurations on some vehicles, e.g., higher speed vehicles, some reduction in front brake capacity is required or desirable at times to maintain vehicle control. For example, a reduction in front brake capacity is highly desirable particularly on slippery road conditions for numbers of types of vehicles. However, it remains highly desirable to provide full output pressure for retaining maximum stop capability under panic conditions.

Figure 3:
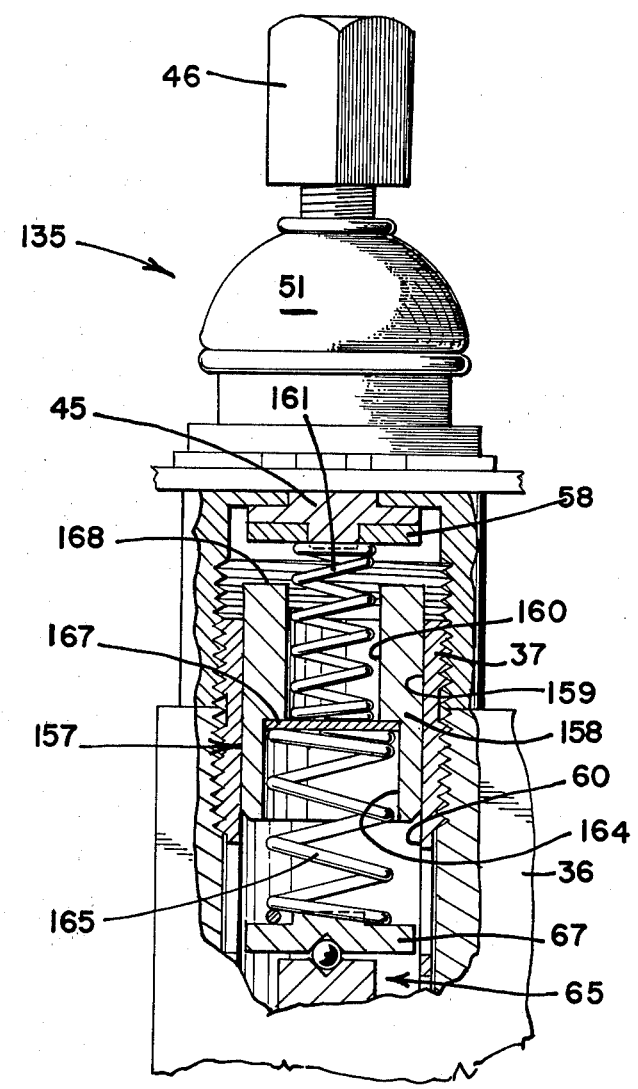
FIG. 3 is a fragmentary elevational view of a modified valve module similar to the valve module of FIG. 1 with portions broken away to depict the components of a staged regulator spring assembly.

A modified valve module, generally indicated by the numeral 135 in FIG. 3, depicts a manner of providing such reduction in brake capacity over a portion of the travel of the mechanical actuator plunger 45. The components of modified valve module 135 may be identical to those identified and described in relation to the valve module 35 except as hereinafter detailed. The modified valve module 135 differs primarily in the provision of a staged regulator spring assembly, generally indicated by the numeral 157. The regulator spring assembly 157 has an annular spring guide 158 having an outer surface 159 adapted to slidingly engage the internal bore 60 which extends into valve housing 36 and actuator housing 37. The annular spring guide 158 has a small bore 160 in one axial extremity thereof to house a primary spring 161 which extends outwardly thereof and attaches to the spring seat 58. The other axial extremity of annular spring guide 158 has a large bore 164 which houses a secondary spring 165 which extends outwardly thereof and is seated on the spring seat 67. A separator plate 167 may be interposed between the secondary spring 165 and primary spring 161 and disposed at the juncture between the small bore 160 and large bore 164 within the large bore 164.

In operation the primary spring 161 compresses during the initial travel of the actuator plunger 45 to provide a relatively soft spring rate during a portion of the travel of the actuator plunger 45. During this portion of the travel of the actuator plunger 45 there is minimal compression of secondary spring 165 such that linearly responsive pressure control is effected based primarily upon the characteristics of the primary spring 161. After typically 50 to 65% of the total stroke of actuator plunger 45 is effected the spring seat 58 engages the upper axial extremity 168 of annular spring guide 158 such that further downward movement (as viewed in FIG. 3) of the actuator plunger 45 produces compression of the secondary spring 165 only. Control upon subsequent compression of spring 165 is linearly responsive to the characteristics of that spring. It can thus be seen that selection of primary and secondary spring 161 and 165 can be made in such manner as to provide desired spring rates for any vehicle requirements with staging from the primary spring 161 to the secondary spring 165 taking place at any selected increment along the travel of actuator plunger 45. The feel characteristics of regulator spring assembly 157 are transmitted with the apparent staging in a manner similar to that described in regard to the valve module 35.

Figure 4:
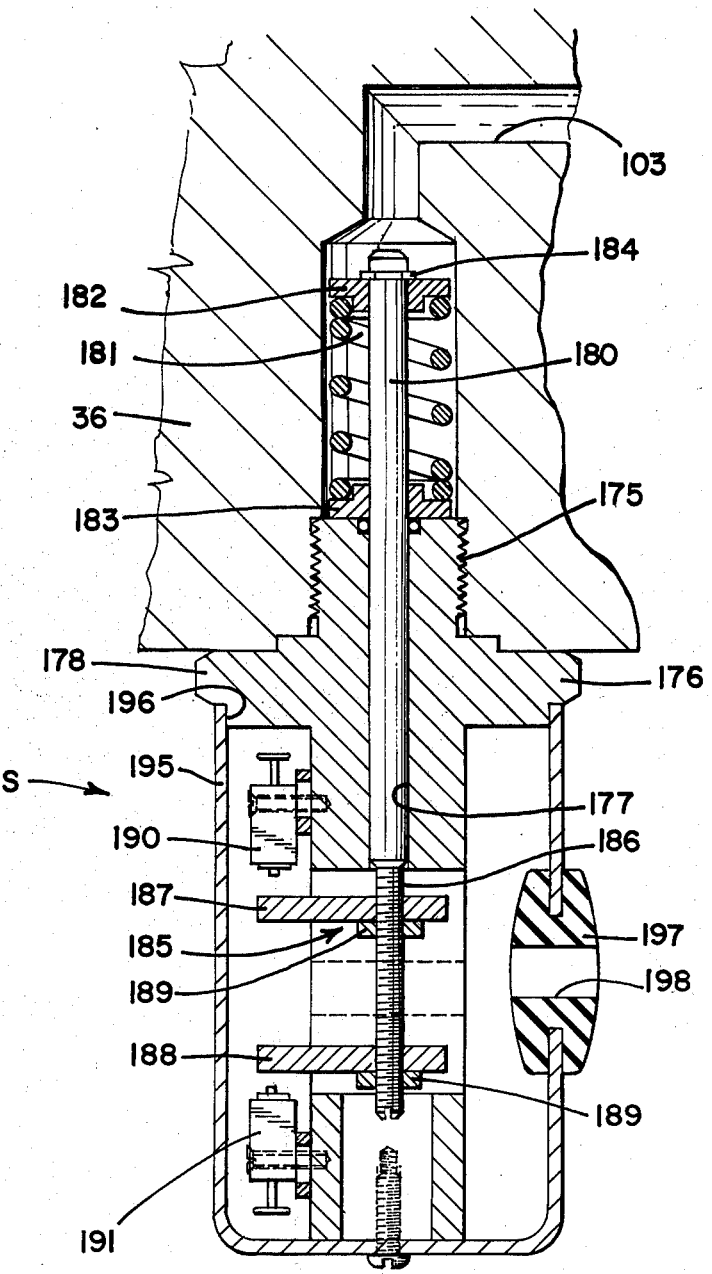
FIG. 4 is a sectional view depicting an exemplary pressure switch which senses variations in accumulator pressure provided to the valve module of FIG. 1.

The aforementioned pressure switch S which senses the supply of fluid from the power source PS to the accumulator A of FIG. 1 may be configured as depicted in FIG. 4. As shown, the pressure switch S may be inserted into the valve housing 36 to which it may be detachably affixed by a threaded coupling 175 for communication with the duct 103 connecting with inlet duct 100 extending between power source PS and accumulator A (see FIG. 1). As shown, the threaded coupling 175 may be located on a T-shaped body 176 of the pressure switch S. The T-shaped body 176 has a through bore 177 extending the length of body 176 through the threaded coupling 175. The T-shaped body 176 has a radial projection 178 through which the bore 177 extends centrally thereof. Bore 177 is sized to accommodate a movable shaft 180 which extends entirely through the T-shaped body 176 and projects a distance outwardly thereof at either axial extremity to accommodate other components hereinafter described. The portion of shaft 180 extending outwardly of the threaded coupling 175 of the body 176 has a spring 181 circumposed thereabout which is retained between spring seats 182 and 183. Spring seat 183 abuts the upper axial extremity of T-shaped body 176 as viewed in FIG. 4 in stationary position thereagainst. Spring seat 182 is retentively positioned along shaft 180 by a snap ring 184. The pressure in duct 103 therefore operates on the shaft 180 such as to compress spring 181 and establish a pressure balance with shaft 180 positioned as depicted in FIG. 4 with normal operating pressure in the duct 103 reflecting a normal operating pressure in inlet duct 100 connecting the power source PS and accumulator A.

The extremity of movable shaft 180 opposite the spring 181 carries an actuator assembly, generally indicated by the numeral 185. As shown, the actuator assembly 185 has a portion of the extremity of shaft 180 threaded at 186 to receive actuator plates 187 and 188. The actuator plates 187 and 188 may be axially adjustably positioned along the threaded portion of movable shaft 180 for selective positioning therealong. Jam nuts 189 may be employed in conjunction with each of the actuator plates 187, 188 for purposes of maintaining the plates in any selected position. Electrical or other sensors such as microswitches 190 and 191 may be positioned relative to the actuator plates 187 and 188, respectively, such that engagement by the respective plates will institute a control signal as hereinafter described. The entire actuator assembly 185 and microswitches 190 and 191 may be enclosed in a housing 195 attached to a seat 196 on the radial projection 178 of T-shaped body 176. A resilient grommet 197 having a wireway 198 may be provided to accommodate wiring or other connectors leading from the microswitches 190,191 to other control elements.

In operation, the pressure switch S has the movable shaft 180 in the position depicted in FIG. 4 with a constant normal operating pressure in the duct 103. In this normal position the actuator plates 187 and 188 are out of contact with the respective sensors, microswitches 190, 191. As shown a predetermined space may be provided between the actuator plates 187 and 188 and the microswitches 190,191, respectively, for purposes of permitting an allowable extent of deviation in the position of movable shaft 180 upon minor pressure fluctuations in the duct 103 which are not of sufficient magnitude to adversely affect the operation of valve module 35. In the event of a predetermined loss in pressure in the duct 103 as, for example, by failure of the power source S, the spring 181 would expand from its partially compressed normal position and displace movable shaft 180 axially upwardly as viewed in FIG. 4. A movement of shaft 180 a sufficient distance to endanger safe system operation would result in the actuator plate 187 engaging microswitch 190. Actuation of the microswitch 190 may serve to introduce a secondary power source, automatically effect actuation of the brakes before critical deterioration in the pressure and/or provide a warning signal or institute supplemental action in the system as will be appreciated by a person skilled in the art.

In the event of substantially greater than normal pressure in the duct 103 the movable shaft 180 would be moved downwardly (as viewed in FIG. 4) compressing the spring 181. Excess pressure conditions sufficient to threaten safe operation of the system would result in actuator plate 188 engaging microswitch 191 to institute a signal which could provide an appropriate warning to the operator of a vehicle or effect control of the output of power source PS. The adjustable positioning of actuator plates 187, 188 as hereinabove described permits institution of these corrective and warning systems at preselected conditions depending upon system design. It will be apparent to persons skilled in the art that other arrangements, e.g., a single actuator plate engaging two different sensors or switches might be employed to effect comparable results.

In some instances it is desirable in a full capability brake controller to provide proportional control to the brakes in addition to foot control as for the application of a hand brake and to supply braking in the event of accumulator pressure failure. Such control may be provided individually or as an integrated attached module. As seen in reference to FIG. 2 a pilot regulator and automatic application module, generally indicated by the numeral 235, is attached to the valve housing 36 depicted in detail in FIG. 1. The pilot regulator and automatic application module 235 has a valve housing 236 and an actuator housing 237. The valve housing 236 and actuator housing 237 may be detachably joined as by a snap ring 238 positioned on the actuator housing 237 which engages a lip 239 of a clamp plate 240 attached to the valve housing 236 as by cap screws 241. The actuator housing 237 partially encases an actuator plunger 245 which extends outwardly of the housing 237. The actuator plunger 245 may have proximate the extremity which extends outwardly of housing 237 a projecting pin 246. The pin 246 may be engaged by a lever 247 or other coupling for purposes of effecting movement of the actuator plunger 245. As shown, the lever 247 may take the form of a bell crank which is pivoted about a pivot pin 248 and has one arm 249 extending from pivot pin 248 with an elongate slot 250 for receiving the pin 246 projecting from the actuator plunger 245. The second leg 251 of the lever 247 has an aperture 252 or other fitting for the attachment of a cable C or other movable element. Rotation of the lever 247 is in the depicted embodiment effected by the application of a force producing displacement of cable C in the direction depicted by the arrow in FIG. 2. The cable C may be, for example, suitably routed to a conventional vehicle hand brake (not shown).

The actuator plunger 245 extends through a bore 255 in the actuator housing 237 and terminates in an enlarged bore 256 which houses a regulator spring 257. The actuator plunger 245 is connected for displacement of regulator spring 257 in bore 256 by a spring seat 258 which seats one extremity of regulator spring 257. The regulator spring 257 also extends into a bore 260 in valve housing 236. The valve housing 236 in addition to bore 260 is provided with a bore 261 which receives a differential area regulating spool, generally indicated by the numeral 265. As shown, the regulating spool 265 is an elongate annular sleeve 266 positioned such that an extent thereof extends into enlarged bore 260 of the valve housing 236. The axial extremity of the spool 265 extending into bore 260 of valve housing 236 interengages the regulator spring 257. This interengagement is effected by a spring seat 267 which seats the opposite end of regulator spring 257 from the spring seat 258. A ball 268 positioned in a conical seat 269 in spring seat 267 which also seats in the axial extremity of the regulating spool 265 provides interconnection between regulator spring 257 and spool 265 for the transmittal of force to the spool 265 while serving as a relief valve as hereinafter described during a portion of the operation of the pilot regulator and automatic application module 235.

The aforementioned extension of spool 265 is effected by a spool return spring 275 which biases the spool 265 into engagement with regulator spring 257 via ball 268 and spring seat 267. The return spring 275 is positioned in bore 261 in valve housing 236.

Figure 2:
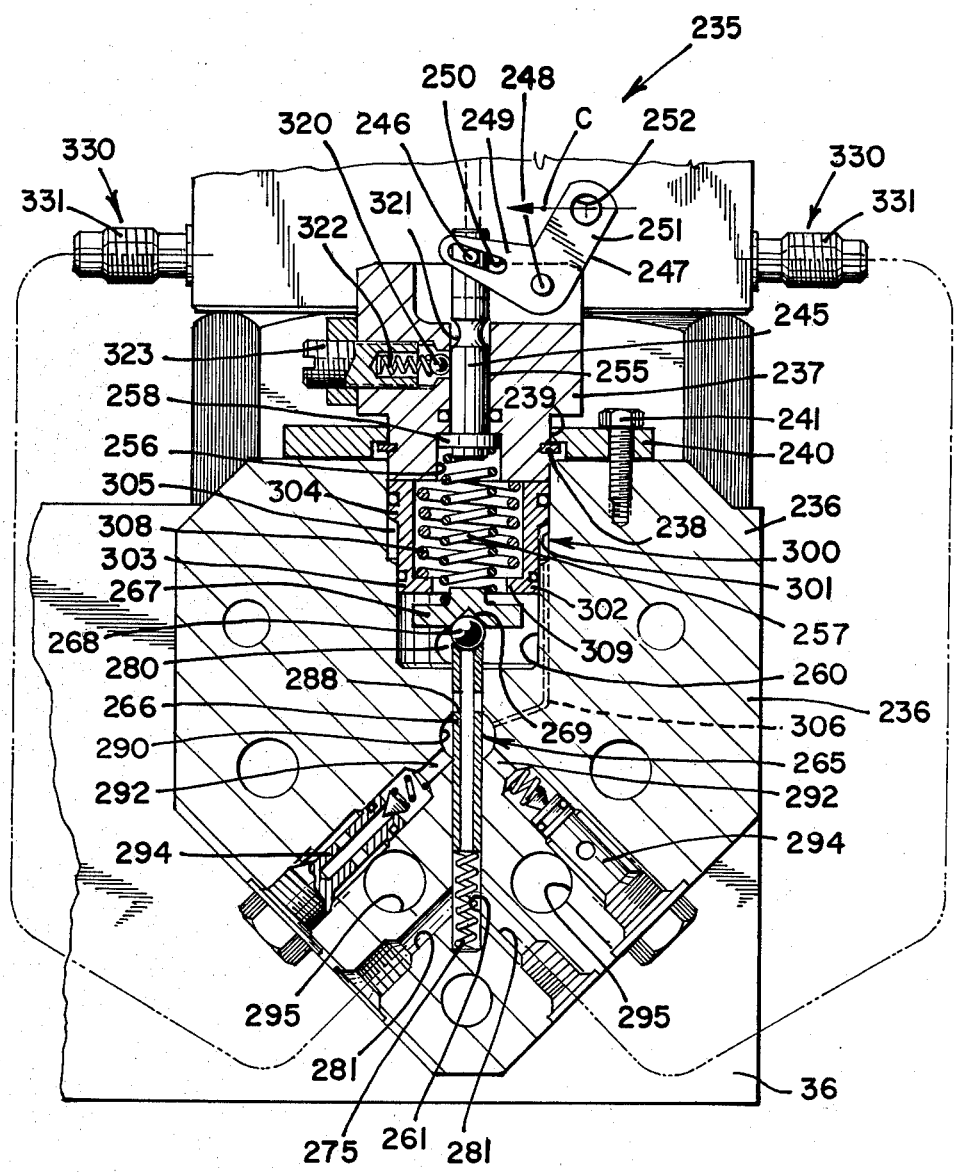
FIG. 2 is a sectional view of a pilot regulator and automatic application module according to the present invention for use in conjunction with the valve module of FIG. 1 to provide additional proportional control to the brakes and supply braking in the event of unusual accumulator pressure decay.

With the spool 265 extended into bore 260 in the nonactuated position of the lever 247 depicted in FIG. 2, no output pressure is provided from the pilot regulator and automatic application module 235. As can be seen by reference to FIG. 2 a channel 280 in the periphery of bore 260 is connected preferably internally of valve housing 236 to the reservoir or tank T. The fluid outlet to the brakes B or to the valve module 35 as hereinafter described is effected by virtue of one or more ducts 281 which extend into the valve housing 236 and communicate with the bore 261 in the area of return spring 275 beyond the extent of travel of the spool 265 of sleeve 266 within the bore 261. Thus, in the nonactuated position any pressure in the brakes B and brake ducts 281 is continually relieved through the bore 261 internally of sleeve 266, between the sleeve 266 and ball 268 into the bore 260 and thus via tank channel 280 to the reservoir or tank T. In the depicted position a condition of no pressure in brake ducts 281 is continuously maintained.

Upon actuation of the lever 247 producing downward movement as viewed in FIG. 2 of the actuator plunger 245 the regulator spring 257 is compressed to advance the spool 265 downwardly thereby positively seating the ball 268 in the extremity of sleeve 266. Any further movement of spool 265 downwardly in response to movement of actuator plunger 245 moves a pressure transfer aperture 288 of spool 265 into connection with an accumulator channel 290 formed in the bore 261. The accumulator channel 290 is serviced by one or more accumulator ducts 292. The accumulator ducts 292 have conventional check valve assemblies 294 which communicate via interconnecting accumulator ports 295 with one or more of the accumulators A associated with the valve module 35. Thus, the pressurized fluid from accumulator A is permitted to flow through the check valves 294, the accumulator duct 252 to the accumulator channel 290, through the pressure transfer aperture 288 internally of the sleeve 266 and thus to and through the bore 261 and brake ducts 281.

The pressurized fluid from the accumulator thus flows to brake ducts 281 until such time as the pressure internally of spool 265 operating on the sleeve 266 is equal to the pressure created by regulator spring 257 by virtue of the positioning of the actuator plunger 245. When the pressure is so equalized the spool 265 has moved upwardly (as viewed in FIG. 2) a sufficient distance to move the pressure transfer aperture 288 out of communicating alignment with the accumulator channel 290 to thus stabilize the system at then existent pressure in the brake ducts 281.

In view of the fact that pilot regulator and automatic application module 235 is contemplated as an ancillary system a differential area regulating spool of the type employed in conjunction with the valve module 35 is not necessitated and thus is preferably not employed to effect a less complex configuration. However, the spool 265 does operate in such a fashion that the pressure control is linearly responsive to the displacement of actuator plunger 245 during increasing or decreasing pressure operation. Further, the flow rate of accumulator fluid to the brake ducts 281 is a function of the rate at which the spool 265 is shifted in response to compression of the regulator spring 257 by movement of actuator plunger 245.

Upon return of the lever 245 as by the release of a hand brake operating the cable C the actuator plunger 245 is positively moved to the initial position as depicted in FIG. 2. This reduces compression of the regulator spring 257 such that the spool 265 returns to the position depicted in FIG. 2, whereby flow is terminated from the accumulator A to the brake ducts 281 by moving transfer aperture 288 out of communication with the accumulator channel 390. The pressure in brake ducts 281 is quickly relieved to tank T by the reinstitution of the fluid flow from the brake ducts 281 through bore 261, interiorly of sleeve 266, around the ball 268 and to the tank channel 280 located in bore 260. The initial condition of the pilot regulator and automatic application module 235 is thus reestablished.

The pilot regulator and automatic application module 235 has for purposes of effecting the institution of braking upon a predetermined drop in accumulator pressure an automatic application assembly, generally indicated by the numeral 300. The automatic application assembly 300 is positioned in the valve housing 236 preferably proximate its juncture with the actuator housing 237 in the area of regulator spring 257. As shown, the automatic application assembly 300 includes a cylinder casing 301 formed as an enlarged portion of the bore 260. The cylinder casing 301 houses a piston 302 which has a small diameter portion 303 which engages the bore 260 and a large diameter portion 304 which engages the cylinder casing 301. The axial length of the large diameter portion 304 is of lesser extent than the axial length of cylinder casing 301 such that an annular pressure chamber 305 is formed which communicates with the accumulator A by means of a suitable duct 306. Thus, accumulator pressure acts through the annular pressure chamber 305 on the piston 302 to seat the piston against the actuator housing 237 as depicted in FIG. 2 of the drawings.

The piston 302 is hollow to accommodate the regulator spring 257 and to receive a spring 308 circumposed about regulator spring 257 which is compressed between the actuator housing 237 and a radially inturned flange 309 which may be at the axial extremity of piston 302. The spring 308 is designed such that upon a predetermined reduction in the pressure in annular pressure chamber 305 the piston 302 will move downwardly as viewed in FIG. 2 into engagement with the spring seat 267 to thus effect movement of the regulating spool 265 to institute a gradual application of the pilot regulator and automatic application module 235. Thus, in the event of accumulator failure, the brakes would be automatically serviced with remaining accumulator pressure. The design of spring 308 and annular pressure chamber 305 is preferably such that a number of emergency brake applications could be effected without accumulator pressure derogating to such an extent that piston 302 would engage spring seat 267 and institute braking action. It should also be appreciated that initial start-up of a vehicle having discharged accumulators would result in available pressure locking the brakes until pump pressure restores operational pressures in the accumulators. The automatic application assembly 300 would release braking only when accumulator pressure reaches safe operating levels such that a vehicle could not readiy be moved with accumulators having dangerously low pressure levels.

In some instances it is desirable that the actuator plunger 245 of the pilot regulator and automatic application module 235 be maintained in a maximum braking application position and held therein until a positive displacement of the lever 247 is effected to produce a reduced or discontinuance of the braking output. This may be accomplished by a pressure ball 320 located in the actuator housing 237. The pressure ball 320 engages a detent 321 formed in the actuator plunger 245 which is in coincidence with the ball 320 when the actuator plunger 245 is in the maximum or full braking output position. The pressure ball 320 may be positioned by a spring 322 which seats in a plug 323 which is axially adjustable in the housing 237 as by threaded engagement therewith. This configuration provides for adjustment of pressure ball 320 such that any desired increment of force may be required to release actuator plunger 245 from its maximum output position.

The output of the brake ducts 281 of pilot regulator and automatic application module 235 may supply pressurized fluid which can be directed to the brakes through check valves provided at main output ports to the brakes, particularly if relatively slow brake application is desired. In the event that more rapid response is desired this output may be supplied to the main control and particularly the valve module 35. As seen schematically in FIG. 2, the ducts 281 are connected via suitable conduits to a hydraulic override, generally indicated by the numeral 330, seen in FIG. 1 as an attachment to the valve module 35. A hydraulic override 330 may be provided for each valve module 35 of a braking system.

As shown, the hydraulic override 330 has a manifold 331 which is attached to and has a duct 332 extending through the actuator housing 37. The duct 332 terminates in a channel 333 which may be formed in the bore 55 in actuator housing 37. The channel 333 is of sufficient axial length to communicate with a port 334 positioned in the mechanical actuator plunger 45 through the travel of the plunger 45. Port 334 connects to a bore 335 in the mechanical actuator plunger 45 having an override plunger 336 housed in a portion of the bore. The override plunger 336 carries at its outward extremity a ball 337 which is seated in conical seats 338 and 339 in the plunger 336 and spring seat 58, respectively, by a return spring 340. The override plunger 336 is normally maintained in the position depicted in FIG. 1 in the absence of an input from the ducts 281. With the return spring 340 maintaining the plunger 336 thus seated, fluid introduced to the hydraulic override 330 is transmitted to the chamber of bore 335 where return spring 340 is positioned via port 334. The fluid pressure thus introduced serves to displace the override plunger 336 axially outwardly of the mechanical actuator plunger 45 thereby moving the spring seat 58 and compressing regulator spring 57 to effect actuation of valve module 35 in a manner similar to that effected by the displacement of mechanical actuator plunger 45 as hereinabove described.

It is to be appreciated that any such displacement of the override plunger 336 feeds back to the brake pedal 15 in a manner comparable to displacement of the mechanical actuator plunger 45. It is also to be noted that the hydraulic override 330 maintains a given braking condition dependent upon the pressurized fluid introduced until varied or released. The mechanical actuator plunger 45 has no operative effect with respect to reducing the hydraulic override positioning of regulator spring 57; however, manual actuation of the pedal 15 can be increased to a point such that the mechanical actuator plunger 45 is extended axially beyond a position assumed by the override plunger 336 such that greater braking is effected manually by the plunger 45 establishing a greater displacement of spring seat 58 and thus an increased compression of regulator spring 57.

Thus it should be evident that the brake controller disclosed herein carries out the various objects of the invention set forth hereinabove and otherwise constitutes an advantageous contribution to the art. As may be apparent to persons skilled in the art, modifications can be made to the preferred embodiment disclosed herein without departing from the spirit of the invention, the scope of the invention being limited solely by the scope of the attached claims.

I claim:

1. A hydraulic controller for providing regulated transfer of pressurized fluid between a tank, an accumulator serviced by a source of pressurized fluid, and the brakes of a vehicle comprising, housing means, actuator plunger means extending into said housing means, regulator spring means operatively connected to said actuator plunger means, means for selectively moving said actuator plunger means to controllably compress said regulator spring means, a regulating spool variably positioned by said regulator spring means and the pressurized fluid to relieve pressurized fluid in the brakes to the tank and to provide pressurized fluid from the accumulator to the brakes at a pressure proportional to the compression of said regulator spring means, and means permitting the pressurized fluid provided to the brakes and balancing the compression of said regulator spring means to operate on only a portion of the radial extent of said regulating spool.

2. A controller according to claim 1, in which the control of pressurized fluid to the brakes is linearly responsive to the compression of said regulator spring means.

3. A controller according to claim 1, having means for continually biasing said regulating spool into engagement with said regulator spring means.

4. A controller according to claim 3, wherein said means for continually biasing said regulating spool is a spring.

5. A controller according to claim 1, including means for relieving pressure in the brakes by establishing communication with the tank when said actuator plunger means is in the non-actuated position.

6. A controller according to claim 1, including means providing for flow of pressurized fluid from the accumulator to the brakes upon actuation of said actuator plunger means.

7. A controller according to claim 1, wherein spring seats are interposed between said regulator spring means and said actuator plunger means and between said regulator spring means and said regulating spool.

8. A controller according to claim 7, wherein a ball is positioned between one of said spring seats and said regulating spool.

9. A controller according to claim 1, wherein said regulating spool has an axial bore forming a reaction pressure chamber, the area of said bore constituting the portion of the radial extent of said regulating spool on which said pressurized fluid operates.

10. A controller according to claim 9, wherein an orifice extending through said regulating spool into said axial bore supplies pressurized fluid to said reaction pressure chamber from the accumulator when the accumulator provides pressurized fluid to the brakes.

11. A controller according to claim 9, wherein a reaction piston is positioned in said axial bore in said regulating spool with one end engaging said housing means and the opposite end engaging a return spring housed in said reaction pressure chamber, said return spring biasing said reaction piston into engagement with said housing and said regulating spool into said regulator spring means.

12. A controller according to claim 11 having a reservoir connected to the tank surrounding the end of said reaction piston engaging said housing means to drain pressurized fluid escaping from said reaction pressure chamber between said axial bore and said reaction piston.

13. A controller according to claim 11 having a sleeve in said housing means, port means in said sleeve and cavity means in said regulating spool for selectively connecting said port means to provide flow of pressurized fluid from the accumulator to the brakes.

14. A controller according to claim 13 including means in said regulating spool connected to said cavity means and selectively communicating with the tank to relieve pressurized fluid in the brakes to the tank.

15. A hydraulic controller for providing regulated transfer of pressurized fluid between a tank, an accumulator serviced by a source of pressurized fluid, and the brakes of a vehicle comprising, housing means, actuator plunger means extending into said housing means, regulator spring means operatively connected to said actuator plunger means, means for selectively moving said actuator plunger means to controllably compress said regulator spring means, a regulating spool variably positioned by said regulator spring means and the pressurized fluid to relieve pressurized fluid in the brakes to the tank and to provide pressurized fluid from the accumulator to the brakes at a pressure proportional to the compression of said regulator spring means, and means in said housing means for moving said regulating spool to provide pressurized fluid from the accumulator to the brakes upon a predetermined reduction of pressure of the pressurized fluid in the accumulator.

16. A controller according to claim 15 wherein said regulating spool is an annular sleeve having a ball valve at one extremity providing selective communication to relieve pressurized fluid in the brakes to the tank via said annular sleeve.

17. A controller according to claim 16 having aperture means in said regulating spool for selectively connecting the accumulator and the brakes via said annular sleeve.

18. A controller according to claim 16 including spring means biasing said annular sleeve into engagement with said ball valve.

19. A controller according to claim 15 wherein said means for moving said regulating spool is a piston which is spring-loaded in pressure balancing opposition to the pressurized fluid in the accumulator.

20. A controller according to claim 19 having means for maintaining said actuator plunger means positioned to provide maximum compression of said regulator spring means.

21. A controller according to claim 20 including a spring-loaded ball in said housing means and a detent in said actuator plunger means positioned to receive said ball when said regulator spring means is at maximum compression.

22. A controller according to claim 21 including means for adjusting the pressure on said spring-loaded ball such that the force required to move said detent of said actuator plunger means out of engagement with said spring-loaded ball may be varied.

23. A hydraulic controller for providing regulated transfer of pressurized fluid between a tank, an accumulator serviced by a source of pressurized fluid, and the brakes of a vehicle comprising, housing means, actuator plunger means extending into said housing means, regulator spring means operatively connected to said actuator plunger means, means for selectively moving said actuator plunger means to controllably compress said regulator spring means, a regulating spool variably positioned by said regulator spring means and the pressurized fluid to relieve pressurized fluid in the brakes to the tank and to provide pressurized fluid from the accumulator to the brakes at a pressure proportional to the compression of said regulator spring means, and override means associated with said actuator plunger means for selectively compressing said regulator spring means in response to a pressurized fluid input.

24. A controller according to claim 23 including a plunger housed in a bore in said actuator plunger means for selectively moving a spring seat engaging said regulator spring means and engaged by said actuator plunger means in the absence of a pressurized fluid input to said override means.

25. A controller according to claim 24 including a spring in said bore in said actuator plunger means biasing said plunger into engagement with said spring seat.

26. A controller according to claim 25 including a ball interposed between said plunger and said spring seat and seated in conical seats therein.

27. A controller according to claim 25 including a port in said actuator plunger means connected to said bore and communicating through said housing with the pressurized fluid input.

28. A hydraulic controller for providing regulated transfer of pressurized fluid between a tank, an accumulator serviced by a source of pressurized fluid, and the brakes of a vehicle comprising, housing means, actuator plunger means extending into said housing means, regulator spring means operatively connected to said actuator plunger means, means for selectively moving said actuator plunger means to controllably compress said regulator spring means, and a regulating spool variably positioned by said regulator spring means and the pressurized fluid to relieve pressurized fluid in the brakes to the tank and to provide pressurized fluid from the accumulator to the brakes at a pressure proportional to the compression of said regulator spring means, said regulator spring means being staged to provide a plurality of different spring rates over the travel of said regulator plunger means.

29. A controller according to claim 28 wherein a plurality of springs each provide linearly responsive control of pressurized fluid to the brakes.

30. A controller according to claim 29 having a guide joining said plurality of springs.

31. A controller according to claim 30 wherein a primary spring engages a spring seat attached to said actuator plunger means and said guide and a secondary spring engages said guide, said spring seat engaging said guide to institute compression of said secondary spring.

32. A controller according to claim 30 wherein said guide is an annular member having a small bore for receiving a primary coil spring and a large bore for receiving a secondary coil spring.

33. A controller according to claim 32 including a separator plate in said large bore at a juncture of said bores.

34. A hydraulic controller for providing regulated transfer of pressurized fluid between a tank, an accumulator serviced by a source of pressurized fluid, and the brakes of a vehicle comprising, housing means, actuator plunger means extending into said housing means, regulator spring means operatively connected to said actuator plunger means, means for selectively moving said actuator plunger means to controllably compress said regulator spring means, a regulating spool variably positioned by said regulator spring means and the pressurized fluid to relieve pressurized fluid in the brakes to the tank and to provide pressurized fluid from the accumulator to the brakes at a pressure proportional to the compression of said regulator spring means, and a pressure switch sensing the supply of pressurized fluid from the source of pressurized fluid to said accumulator, said pressure switch having a spring-loaded shaft balanced against normal operating pressure of the source of pressurized fluid.

35. A controller according to claim 34 including an actuator assembly associated with said spring-loaded shaft providing control signals upon predetermined deviations in the operating pressure of the source of pressurized fluid.

36. A controller according to claim 35 including actuator plates adjustable along said spring-loaded shaft relative to switches to control the extent of deviation in operating pressure prior to instituting control signals.

* * * * *